(12) United States Patent
Weisberg et al.

(10) Patent No.: US 9,639,571 B2
(45) Date of Patent: May 2, 2017

(54) METHODS AND SYSTEMS FOR INCREASING CAPACITY AND PERFORMING DATA REBALANCING WITHOUT DOWNTIME TO A DISTRIBUTED SHARED-NOTHING DATABASE WITH SERIALIZABLE ISOLATION

(71) Applicant: VoltDB, Inc., Bedford, MA (US)

(72) Inventors: Ariel D. Weisberg, Stoneham, MA (US); Ning Shi, Acton, MA (US); Steven Z. Cooper, Concord, MA (US); Stefano M. Santoro, Winchester, MA (US)

(73) Assignee: VOLTDB, INC., Bedford, MA (US)

( * ) Notice: Subject to any disclaimer, the term of this patent is extended or adjusted under 35 U.S.C. 154(b) by 253 days.

(21) Appl. No.: 14/549,062

(22) Filed: Nov. 20, 2014

(65) Prior Publication Data

US 2015/0186187 A1   Jul. 2, 2015

Related U.S. Application Data

(60) Provisional application No. 61/921,924, filed on Dec. 30, 2013.

(51) Int. Cl.
*G06F 17/30* (2006.01)
*G06F 9/50* (2006.01)

(52) U.S. Cl.
CPC ...... *G06F 17/30377* (2013.01); *G06F 9/5083* (2013.01); *G06F 17/30312* (2013.01); *G06F 17/30584* (2013.01)

(58) Field of Classification Search
CPC ............... G06F 17/30; G06F 17/30312; G06F 17/30377; G06F 17/30584
USPC .................................................. 707/600–899
See application file for complete search history.

(56) References Cited

U.S. PATENT DOCUMENTS

| | | |
|---|---|---|
| 5,875,334 A | 2/1999 | Chow et al. |
| 5,963,959 A | 10/1999 | Sun et al. |
| 6,081,801 A | 6/2000 | Cochrane et al. |
| 7,631,293 B2 | 12/2009 | Alcorn |
| 7,707,174 B2 | 4/2010 | Saito et al. |
| 7,752,197 B2 | 7/2010 | Dettinger et al. |
| 7,818,349 B2 | 10/2010 | Frost |
| 8,225,058 B2 | 7/2012 | Miyamoto et al. |
| 9,009,203 B2 | 4/2015 | Schreter |
| 2002/0103654 A1 | 8/2002 | Poltorak |
| 2006/0224561 A1 | 10/2006 | Bestgen et al. |
| 2006/0271557 A1 | 11/2006 | Harward et al. |
| 2012/0011106 A1 | 1/2012 | Reid et al. |
| 2012/0143873 A1* | 6/2012 | Saadat ............ G06F 17/30584 707/741 |
| 2013/0198139 A1 | 8/2013 | Skidanov et al. |
| 2013/0198166 A1 | 8/2013 | Prout et al. |
| 2013/0198231 A1 | 8/2013 | Skidanov et al. |
| 2013/0198232 A1 | 8/2013 | Shamgunov et al. |
| 2014/0156586 A1 | 6/2014 | Black et al. |
| 2014/0244666 A1 | 8/2014 | Elias et al. |

\* cited by examiner

*Primary Examiner* — Isaac M Woo
(74) *Attorney, Agent, or Firm* — Goodwin Procter LLP

(57) ABSTRACT

A distributed shared-nothing database provides serializable isolation for transactions and includes a mechanism for adding storage and processing capacity to the database without stopping the database from processing transactions.

16 Claims, 9 Drawing Sheets

METHODS AND SYSTEMS FOR INCREASING CAPACITY AND PERFORMING DATA REBALANCING WITHOUT DOWNTIME TO A DISTRIBUTED SHARED-NOTHING DATABASE WITH SERIALIZABLE ISOLATION

CROSS REFERENCE TO RELATED APPLICATION

This application claims priority from U.S. Provisional Patent Application No. 61/921,924 filed on Dec. 30, 2013 entitled METHODS AND SYSTEMS FOR INCREASING CAPACITY AND PERFORMING DATA REBALANCING WITHOUT DOWNTIME TO A DISTRIBUTED SHARED-NOTHING DATABASE WITH SERIALIZABLE ISOLATION, which is hereby incorporated by reference.

BACKGROUND

The present application relates generally to computer database systems. More particularly, the application is directed to a distributed shared-nothing database that provides serializable isolation for transactions and includes a mechanism for adding storage and processing capacity to the database without stopping the database from processing transactions.

BRIEF SUMMARY OF THE DISCLOSURE

In accordance with one or more embodiments, a computer-implemented method is disclosed for transparently performing data rebalancing with serializable isolation when new logical partitions are added to a distributed shared-nothing database system. The database system maintains data across a plurality of logical partitions each having a single thread of execution and being allocated to a position on a consistent hash ring. The method comprises the steps of: (a) calculating a desired consistent hash ring including an added new partition to the database system in one or more positions in the consistent hash ring previously allocated to one or more pre-existing partitions; (b) generating an index identifying data to be moved from said one or more pre-existing partitions to the new partition; (c) executing a series of rebalancing transactions in serialized transaction queues on said one or more pre-existing partitions and the new partition to transfer different portions of the data to be moved from said one or more pre-existing partitions to the new partition, while maintaining serializable isolation, and updating the consistent hash ring after each rebalancing transaction has been executed to reflect transfer of the data from said one or more pre-existing partitions to the new partition; and (d) rerouting in-flight transactions to the new partition for data moved from the one or more pre-existing partitions to the new partition.

A distributed shared-nothing database system in accordance with one or more embodiments maintains data across a plurality of logical partitions, each having a single thread of execution and being allocated to a position on a consistent hash ring. The system includes at least one processor, memory associated with the at least one processor, and a program supported in the memory for transparently performing data rebalancing with serializable isolation when new logical partitions are added to the database system. The program contains a plurality of instructions which, when executed by the at least one processor, cause the at least one processor to: (a) calculate a desired consistent hash ring including an added new partition to the database system in one or more positions in the consistent hash ring previously allocated to one or more pre-existing partitions; (b) generate an index identifying data to be moved from said one or more pre-existing partitions to the new partition; (c) execute a series of rebalancing transactions in serialized transaction queues on said one or more pre-existing partitions and the new partition to transfer different portions of the data to be moved from said one or more pre-existing partitions to the new partition, while maintaining serializable isolation, and update the consistent hash ring after each rebalancing transaction has been executed to reflect transfer of the data from said one or more pre-existing partitions to the new partition; and (d) reroute in-flight transactions to the new partition for data moved from the one or more pre-existing partitions to the new partition.

DETAILED DESCRIPTION

Various embodiments disclosed herein are directed to a distributed shared-nothing database that provides serializable isolation for transactions and includes a mechanism for adding storage and processing capacity to the database without stopping the database from processing transactions.

Figure 1:
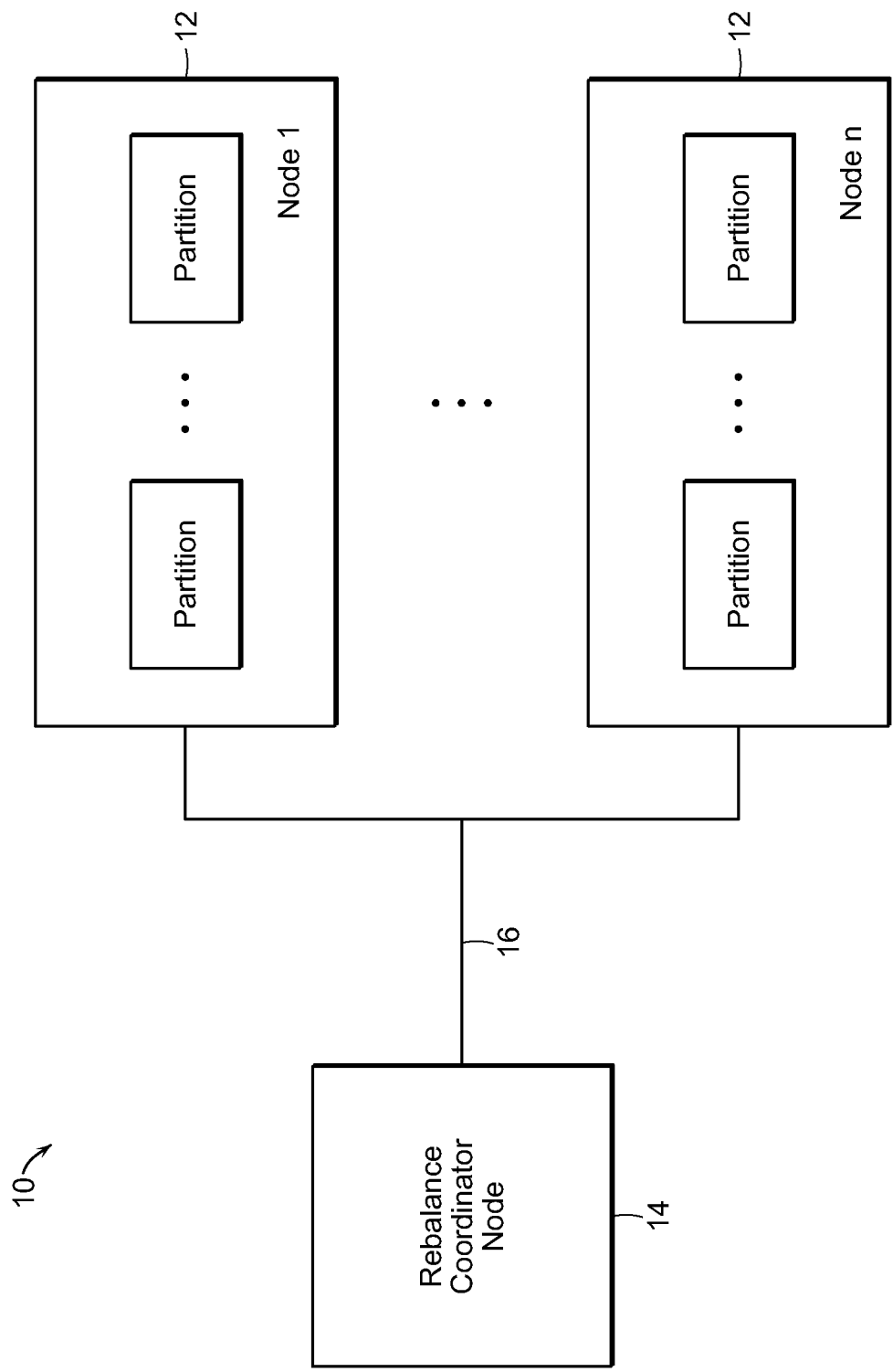
FIG. 1 is a schematic block diagram illustrating a distributed shared-nothing database system in accordance with one or more embodiments.

FIG. 1 is a simplified illustration of a representative distributed shared-nothing database system in accordance with one or more embodiments. The shared-nothing database system 10 maintains data across a plurality of database nodes 12 of a distributed database cluster. Each node 12 includes a plurality of logical partitions. The database nodes 12 are connected to a Rebalance Coordinator node 14 through a computer network 16. Each node includes its own processing, memory, and disk resources. The techniques described herein for increasing capacity and performing data rebalancing may be implemented in one or more computer programs executing on the CPU of the Rebalance Coordinator node 14. The system also includes one or more distributed transaction nodes (not shown) for coordinating distributed transactions among the database nodes 12.

In the exemplary embodiment illustrated in FIG. 1, the functionality of the rebalance coordinator is implemented in the rebalance coordinator node 14. It should be understood, however, that this is by way of example only and that there are many other possible implementations of the role of the rebalance coordinator. For instance, the processes of the rebalance coordinator may be distributed over multiple nodes or the role of the rebalance coordinator may be performed by one or more other components of the database system.

Figure 2:
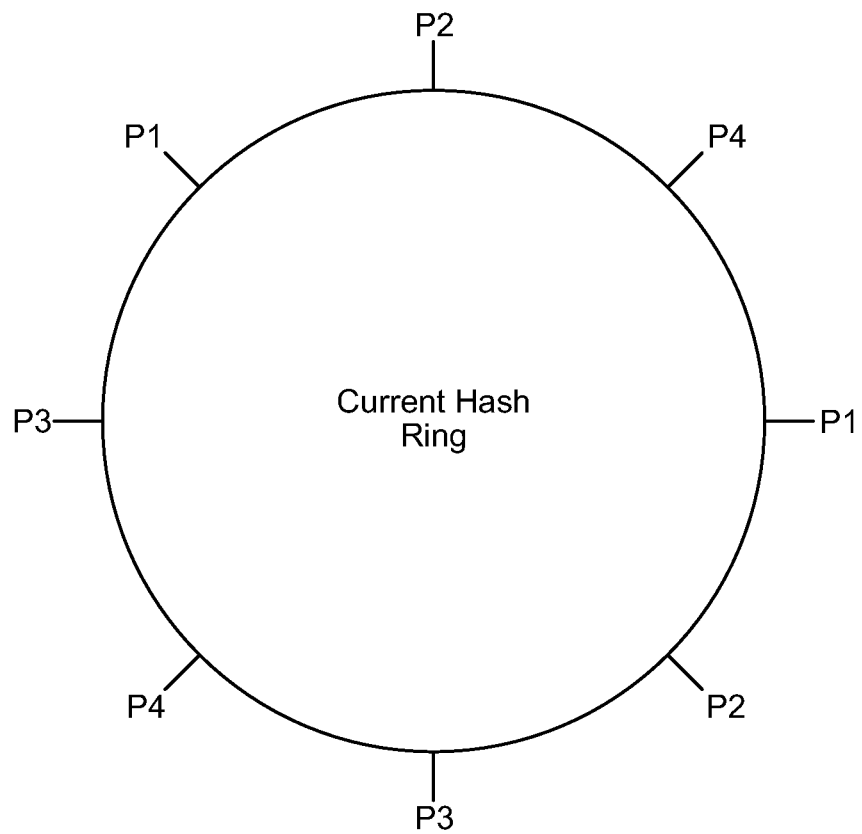
FIG. 2 is a simplified diagram illustrating data partitions on a representative consistent hash ring.

The database system distributes relational data by sharding tables on a column or group of columns (called a partition key) and hashing the key column value for each row in order to determine where, which partition, to store the row. The database is split up into logical partitions. Each partition has a single thread of execution and owns a subset of all the rows in the database that hash to that partition. The database system provides serializable isolation for transactions by executing the transactions serially from a single thread with some operations being parallelized across many threads. Replication is accomplished by synchronously replicating the logical transactions as stored procedure invocations between master and slaves of a partition. The system uses consistent hashing as a distribution strategy with each logical partition placed on the consistent hash ring zero or more times. FIG. 2 is a simplified diagram illustrating data partitions P1-P4 on a representative consistent hash ring.

Tables that share the same partition key will co-locate rows that share the same key even if the rows are in separate tables. The system supports partitioning transactions as well so that a transaction can be routed directly to the partition containing the data instead of routing individual queries contained within the transaction to some or all partitions. The system accepts transactions for any node at any node, and there is an internal routing layer to ensure that transactions run at the correct partition.

Adding capacity to a distributed database involves moving data and transactions associated with that data to new or underutilized nodes in the database. While a subset of data is in-flight, the entire subset must be visible to all the transactions that depend on it and every row in the subset must appear exactly once to each transaction, and updates done from committed transactions must be visible to all subsequent transactions. Transactions that are in-flight also need to be routed to the current location of the data and, if a transaction is misrouted, it must be transparently re-routed.

The database provides transaction execution isolation, meaning that transactions that access data have a guarantee that all the necessary data involved in the transaction, as specified by the partition key provided by the transaction, is visible. That means that data from multiple tables across an arbitrary set of rows may span several partitions for some period of time and in-flight transactions must remain unaware.

Figure 3:
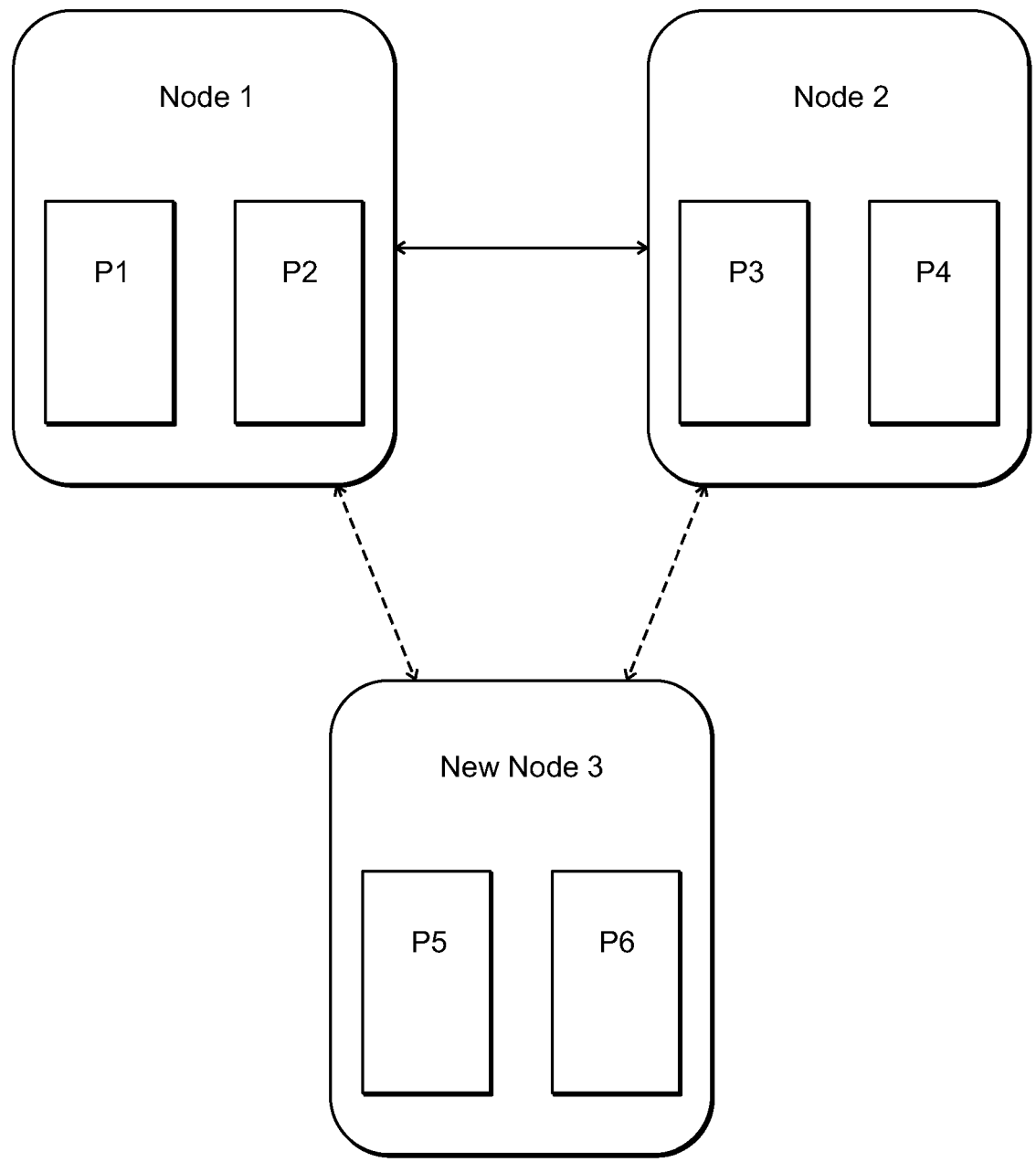
FIG. 3 is a simplified illustration showing the addition of a new node to a database cluster.

A representative process in accordance with one or more embodiments for transactionally adding capacity, one or more new nodes to the database cluster, is as follows:

(1) One or more nodes are added to the database cluster, and the new nodes add their logical partitions to the cluster without any data. The partitions do not yet appear on the consistent hash ring. FIG. 3 is a simplified illustration showing the addition of a new node 3 with logical partitions P5 and P6 to a database cluster.

Figure 4:
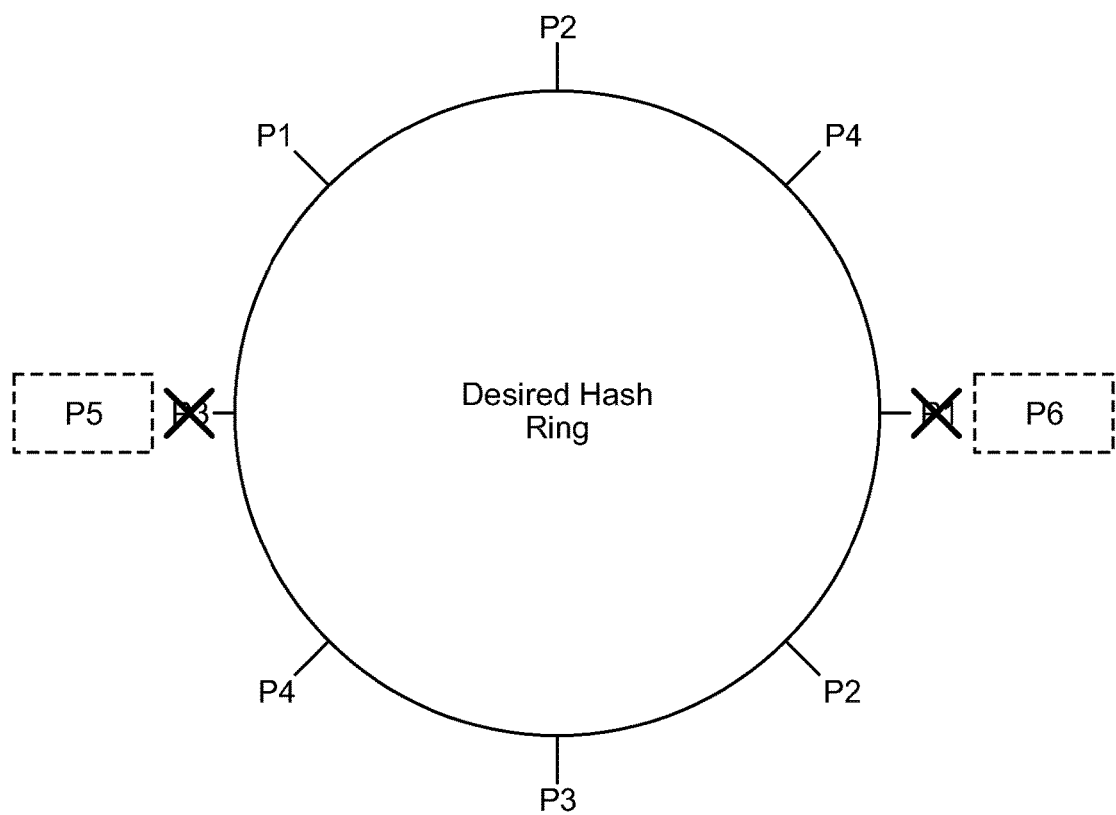
FIG. 4 is a simplified diagram illustrating addition of logical partitions to the hash ring of FIG. 2.

(2) A "rebalance coordinator" is elected to drive the re-balance process. The coordinator calculates a new hash ring containing all the new logical partitions in positions previously allocated to pre-existing partitions. FIG. 4 illustrates addition of logical partitions P5 and P6 to the hash ring of FIG. 2.

Figure 5:
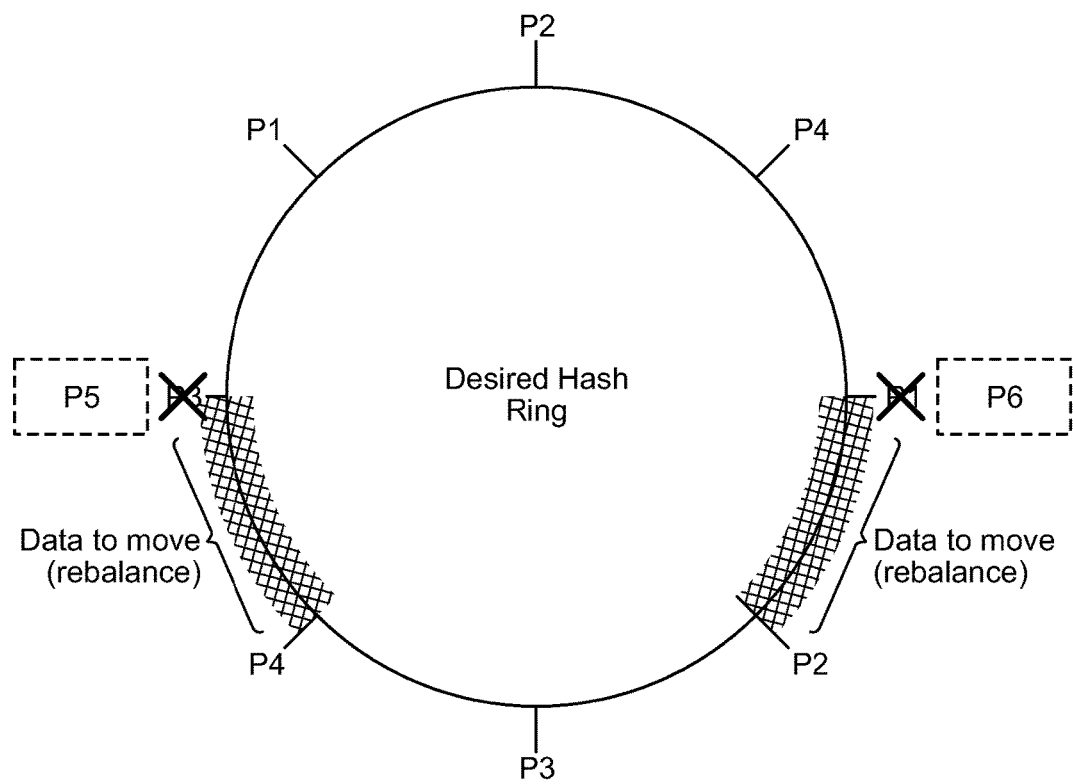
FIG. 5 is a simplified diagram illustrating computed data ranges to be moved.

FIG. 5 is a simplified illustration showing computed data ranges to move.

Figure 6:
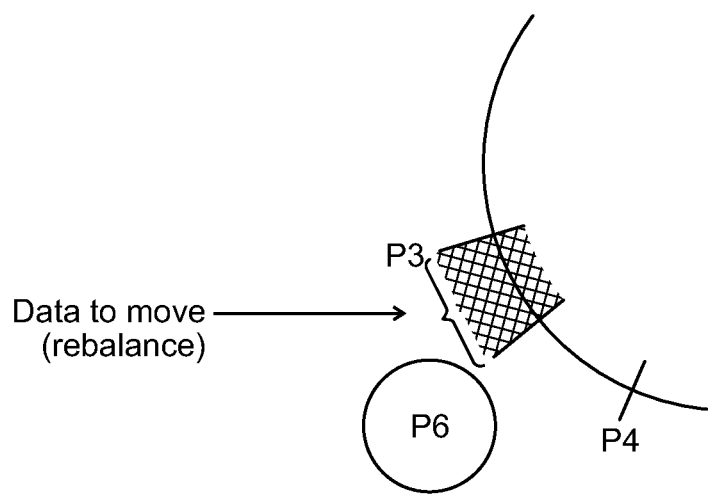
FIG. 6 is a simplified illustration showing the data ranges on a partition to be moved.

FIG. 6 is a simplified illustration showing the data range on partition P3 to be moved to new partition P6.

Figure 7:
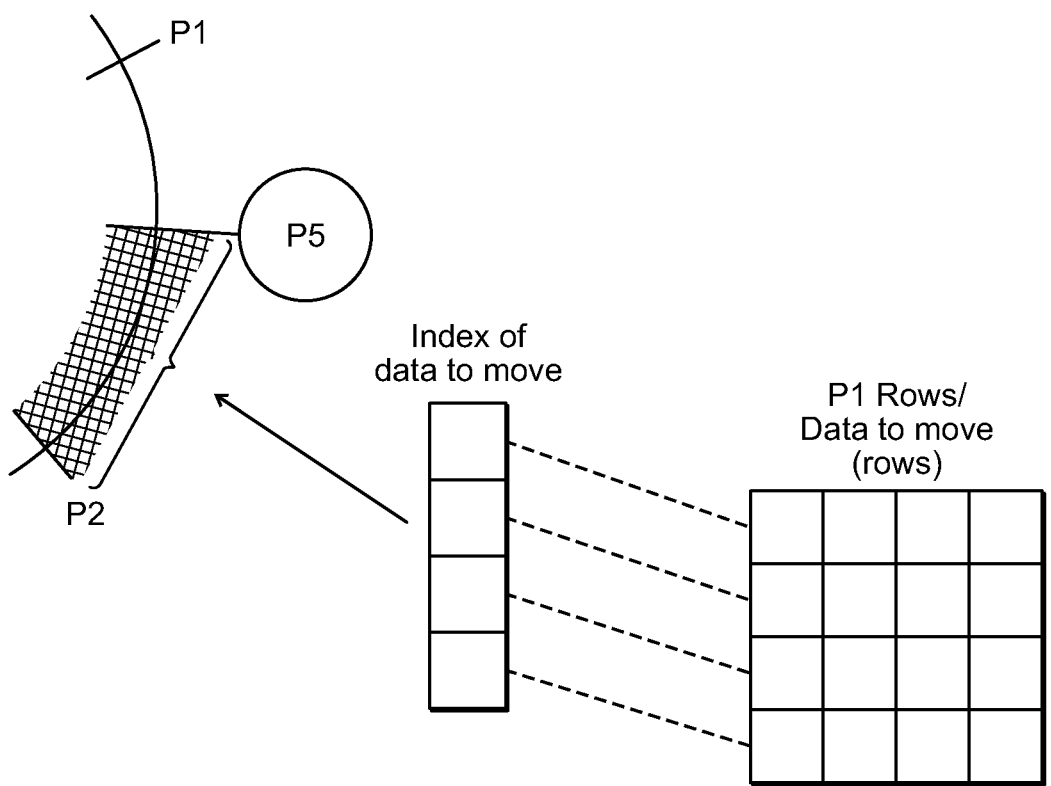
FIG. 7 is a simplified illustration showing an index created for data to be moved.

(3) The rebalance coordinator initiates a background scan to materialize an index on each table containing all the rows that have to be moved across all the ranges involved in the rebalance. The index is updated as part of regular transaction execution so that transactions running during the rebalance process do not invalidate the index and it is a background process that does not block transaction processing. FIG. 7 is a simplified illustration showing an index created for data to be moved.

Figure 8:
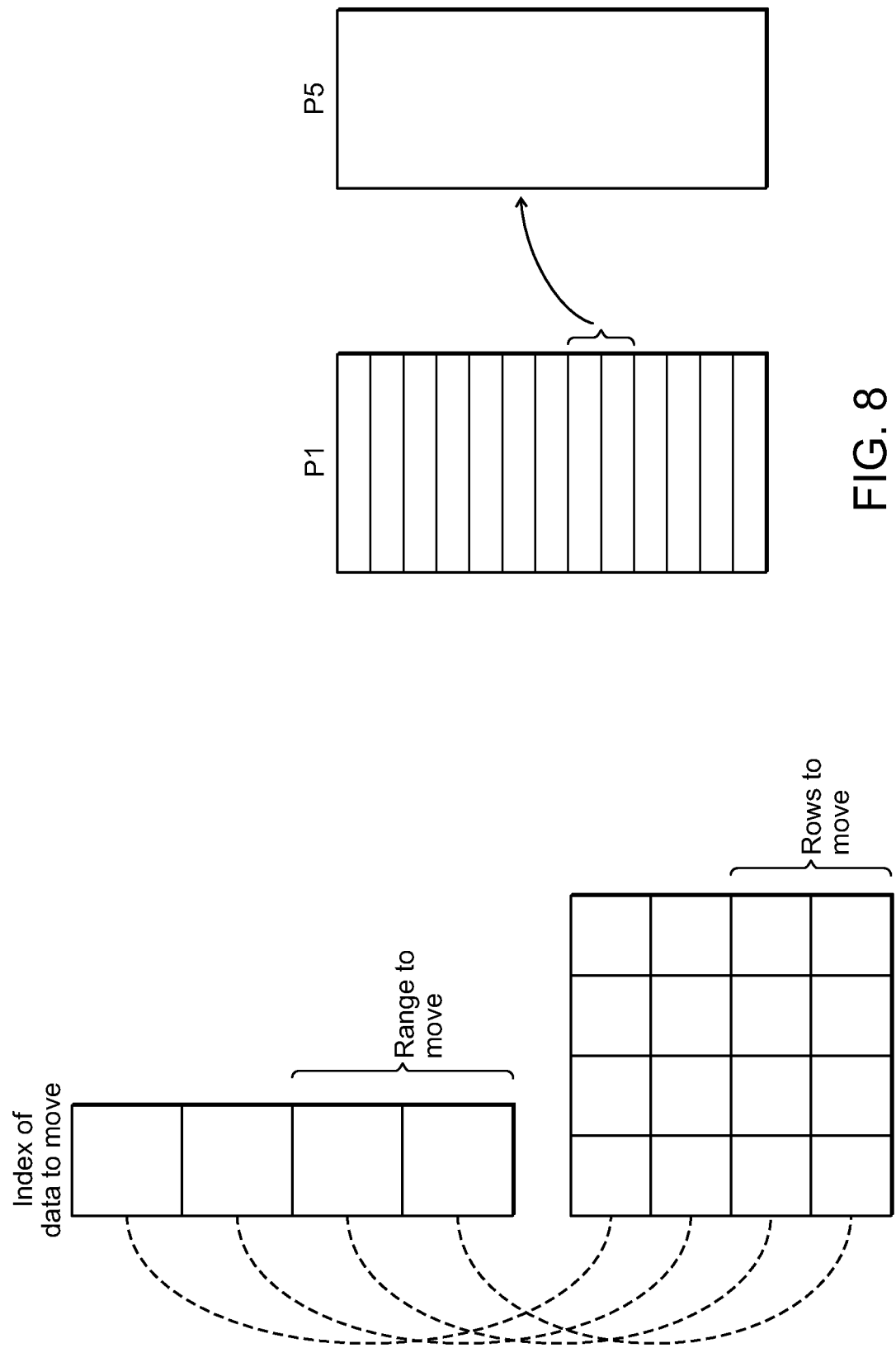
FIG. 8 is a simplified illustration showing a sub-range of data identified to be moved.

(4) Once the index is materialized, the rebalance coordinator selects one of the ranges to be moved and picks a portion of the range that is expected to materialize an amount of data that will take an expected amount of time to transfer, which can be specified by the user (referred to as 'pause time'). By specifying a pause time, a user can control and bound the amount of time their transactions are delayed by rebalance work. FIG. 8 is a simplified illustration showing a sub-range of data identified to move from partition P1 to partition P5.

The distributed transaction only involves the source and the destination partition, so the rebalance process will not stop transaction processing at logical partitions that are not involved in the rebalance. Transactions to move data are called at a frequency determined by the target throughput (in rows or megabytes) requested by the user with the frequency of transactions determined by the amount of data that can be moved within the requested pause time.

Figure 9:
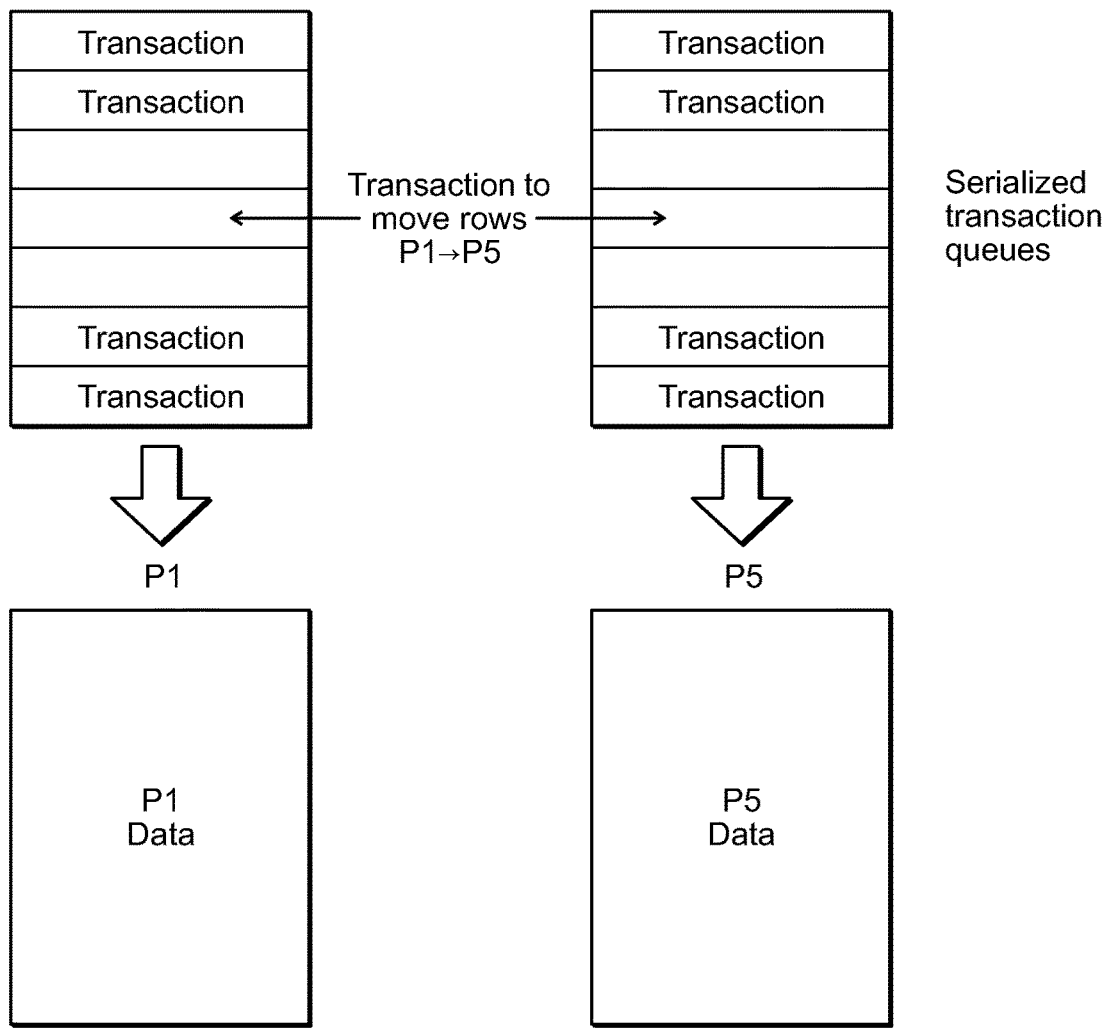
FIG. 9 is a simplified illustration showing serializable isolation maintained during transaction execution.

The distributed transaction transfers the data between logical partitions and maintains serializable isolation by holding back pending transactions until the transfer is complete. The transfer is atomic with respect to data partitioning because the index allows the source to materialize all involved rows in the hash range. FIG. 9 is a simplified illustration showing serializable isolation maintained during transaction execution.

Undo logging is performed at the source and destination during the re-balance process and, if any involved node dies, the transaction is rolled back and restarted, thereby maintaining relational database ACID semantics.

Figure 10:
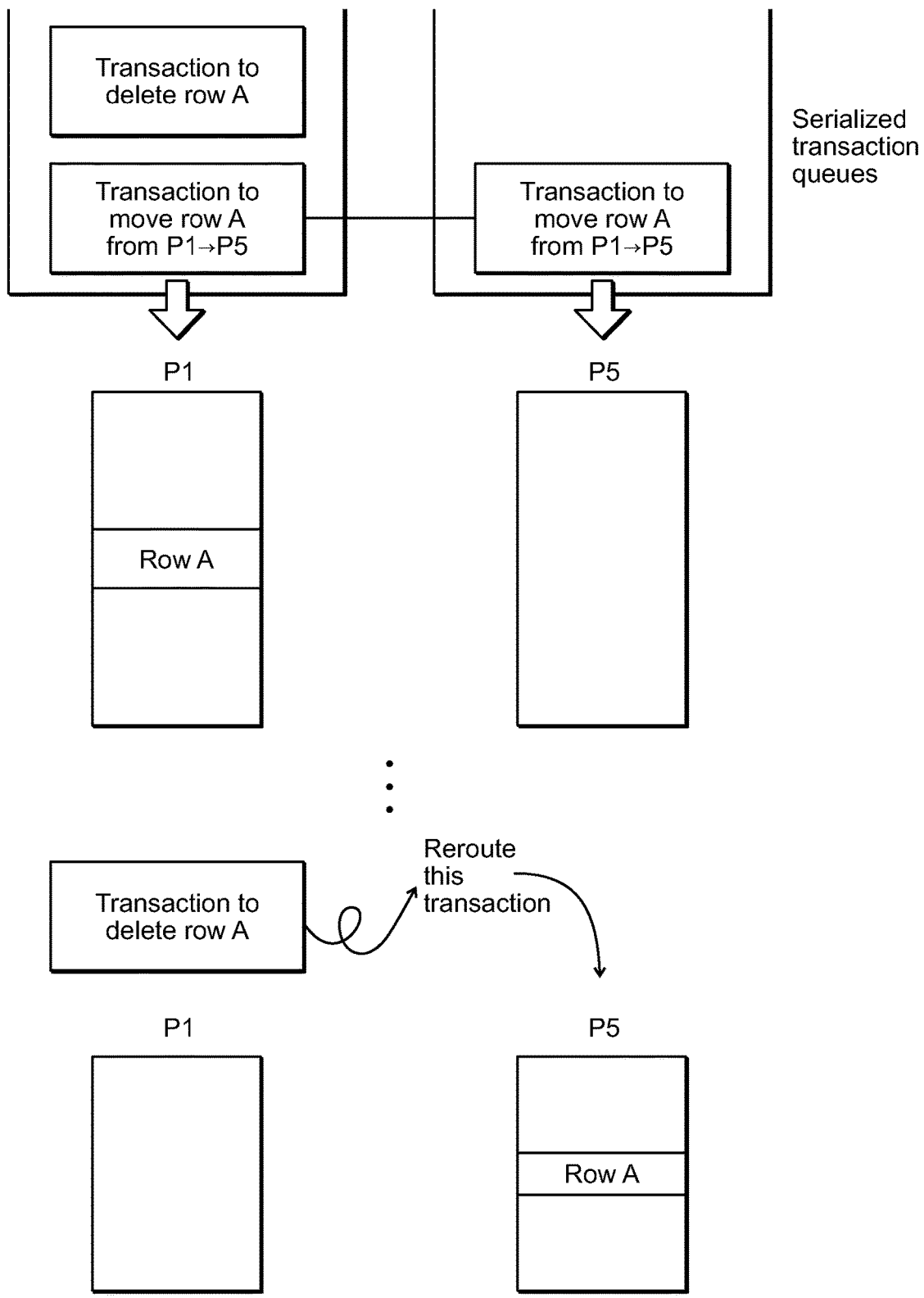
FIG. 10 is a simplified illustration showing rerouting of misrouted in-flight transactions.

(5) When the distributed transaction is first received at each involved partition, it may not be executed immediately if other transactions are queued ahead of it. In-flight transactions for the hash range being moved may arrive before or during the execution of the rebalance transaction. Those in-flight transactions are sent back to the routing mesh to be rerouted along with the updated hash ring containing the latest changes. This allows hash ring updates to be propagated lazily. The hash ring is versioned and serialized by the distributed transaction coordinator so lazily providing updates is safe as it is possible to handle missing or out of order hash ring updates. FIG. 10 illustrates rerouting of misrouted in-flight transactions.

(6) If a write ahead log is being used, it is necessary for the application of the log to result in all transactions executing against the same data set they did originally despite some data being moved to a new location. Typically a transaction is logged to disk as soon as it is received to reduce latency. However, during a rebalance a transaction that is logged to disk may not actually end up executing at the partition where it was logged. The system in accordance with one or more embodiments accounts for these transactions that end up in the wrong log by logging the transactions that move data along with regular transactions and replaying the data movement at recovery time. If a transaction is logged at the wrong partition, then at replay time, it will be rejected and will end up appearing in the command log of the correct partition.

(7) In accordance with one or more embodiments, the two partitions that are blocked in a transaction to rebalance data can have transactions routed to them preemptively load shedded by the transaction system generating an immediate error response to the client. This avoids the situation where are all transactions allowed into the system are destined for the blocked partitions making the other partitions unavailable. The load shedding can be done by specifying a maximum acceptable wait time on a per transaction basis or by a global setting.

(8) A further enhancement of the rebalance process in accordance with one or more embodiments is to avoid blocking the involved partitions for the duration of the data transfer by logging changes to data that has already been rebalanced, and then applying the change log and only blocking transactions when applying the last segment of change log.

In accordance with one or more embodiments, the system maintains high availability by replicating partitions across the cluster. In this manner, the failure of a node can mean that only replica copies are inaccessible, and the cluster still has a complete set of the database data. This mechanism for increasing database capacity behaves the same way by replicating new partitions that are added to the hash ring.

If database durability is enabled, the database must ensure that a consistent state can be reconstructed at any time, even as nodes are added/removed and data is being rebalanced. The system in accordance with one or more embodiments accomplishes this by using a write-ahead log and periodic snapshots of the data set to truncate the log. The snapshots, write-ahead log and it's metadata contain sufficient information to determine what files come from the same cluster, and whether enough information is present to load the data set and replay all transactions.

When new nodes join the cluster a distributed transaction is used to log the change in logical partition count to disk so that the database will be aware on restart that additional logs and snapshot data are required to rebuild the database. The distributed transaction that does the rebalancing is logged so that at replay time, the data movements are replayed and the data for necessary for transactions in the log will always be in position because it will be loaded from the snapshot that truncated the log or moved into position by replaying the data movement.

The snapshots must contain the hash function in use at the time that the snapshot was taken because the hash function in use at replay time may differ and if a log replay is going to follow the snapshot restore the replay will expect the data to be in the original locations.

The rebalance process is highly available. If a node fails, any in-flight rebalance transactions are handled by the distributed transaction mechanism and they are automatically rolled back and restarted. If the elected coordinator that is driving the rebalance process fails it is replaced and the replacement resumes rebalancing until the goal state for the current topology is reached.

If the entire cluster fails during the rebalance process, the process is resumed once command log replay is complete. A coordinator is elected and any remaining necessary rebalance transactions are issued until the goal state is reached.

In addition to adding capacity to an existing cluster, this same mechanism described can also be used to rebalance data between existing partitions (and thus nodes) in the cluster.

Rather than adding new partitions to the hash ring, this step is skipped and existing partitions are shrunk and rebalanced to other partitions.

The processes of the shared-nothing database system described above may be implemented in software, hardware, firmware, or any combination thereof. The processes are preferably implemented in one or more computer programs executing on the rebalance coordinator node, which includes a processor, a storage medium readable by the processor (including, e.g., volatile and non-volatile memory and/or storage elements), and input and output devices. Each computer program can be a set of instructions (program code) in a code module resident in the random access memory of the node. Until required by the node, the set of instructions may be stored in another computer memory (e.g., in a hard disk drive, or in a removable memory such as an optical disk, external hard drive, memory card, or flash drive) or stored on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions. Accordingly, the foregoing description and attached drawings are by way of example only, and are not intended to be limiting.

What is claimed is:

1. In a distributed shared-nothing database system maintaining data across a plurality of logical partitions each having a single thread of execution and being allocated to a position on a consistent hash ring, a computer-implemented method for transparently performing data rebalancing with serializable isolation when new logical partitions are added to the database system, the method comprising the steps of:
   (a) calculating a desired consistent hash ring including an added new partition to the database system in one or more positions in the consistent hash ring previously allocated to one or more pre-existing partitions;
   (b) generating an index identifying data to be moved from said one or more pre-existing partitions to the new partition;
   (c) executing a series of rebalancing transactions in serialized transaction queues on said one or more pre-existing partitions and the new partition to transfer different portions of the data to be moved from said one or more pre-existing partitions to the new partition, while maintaining serializable isolation, and updating the consistent hash ring after each rebalancing transaction has been executed to reflect transfer of the data from said one or more pre-existing partitions to the new partition, wherein serializable isolation is maintained by pausing execution of pending transactions for at least one of the one or more pre-existing partitions and the new partition for a specified amount of time, the specified amount of time representing an amount of time expected to transfer data from the one or more pre-existing partitions to the new partition; and (d) rerouting in-flight transactions to the new partition for data moved from the one or more pre-existing partitions to the new partition.

2. The method of claim 1, wherein the database system comprises one or more database nodes, each including one or more partitions, and a rebalance coordinator node connected in a computer network for performing rebalancing among the partitions.

3. The method of claim 1, wherein step (b) comprises initiating a background scan to materialize the index on each table in the database containing rows to be moved across ranges of data.

4. The method of claim 3, further comprising selecting one of the ranges to be moved, and selecting a portion of the range based on an expected amount of time to transfer data in the portion of the range.

5. The method of claim 4, wherein the amount of time is specified by a user.

6. The method of claim 1, further comprising updating the index as part of regular transaction execution.

7. The method of claim 1, wherein step (d) comprises sending the in-flight transactions to a routing mesh to be rerouted in accordance with the updated consistent hash ring.

8. The method of claim 1, further comprising lazily propagating updates to the consistent hash ring after step (d).

9. A distributed shared-nothing database system maintaining data across a plurality of logical partitions each having a single thread of execution and being allocated to a position on a consistent hash ring, the system comprising:
   at least one processor;
   memory associated with the at least one processor; and
   a program supported in the memory for transparently performing data rebalancing with serializable isolation when new logical partitions are added to the database system, the program containing a plurality of instructions which, when executed by the at least one processor, cause the at least one processor to:
   (a) calculate a desired consistent hash ring including an added new partition to the database system in one or more positions in the consistent hash ring previously allocated to one or more pre-existing partitions;
   (b) generate an index identifying data to be moved from said one or more pre-existing partitions to the new partition;
   (c) execute a series of rebalancing transactions in serialized transaction queues on said one or more pre-existing partitions and the new partition to transfer different portions of the data to be moved from said one or more pre-existing partitions to the new partition, while maintaining serializable isolation, and update the consistent hash ring after each rebalancing transaction has been executed to reflect transfer of the data from said one or more pre-existing partitions to the new partition, wherein serializable isolation is maintained by pausing execution of pending transactions for at least one of the one or more pre-existing partitions and the new partition for a specified amount of time, the specified amount of time representing an amount of time expected to transfer data from the one or more pre-existing partitions to the new partition; and
   (d) reroute in-flight transactions to the new partition for data moved from the one or more pre-existing partitions to the new partition.

10. The database system of claim 9, wherein the database system comprises one or more database nodes, each including one or more partitions, and a rebalance coordinator node connected in a computer network for performing rebalancing among the partitions.

11. The database system of claim 9, wherein (b) comprises initiating a background scan to materialize the index on each table in the database containing rows to be moved across ranges of data.

12. The database system of claim 11, further comprising instructions for selecting one of the ranges to be moved, and selecting a portion of the range based on an expected amount of time to transfer data in the portion of the range.

13. The database system of claim 12, wherein the amount of time is specified by a user.

14. The database system of claim 9, further comprising instructions for updating the index as part of regular transaction execution.

15. The database system of claim 9, wherein (d) comprises sending the in-flight transactions to a routing mesh to be rerouted in accordance with the updated consistent hash ring.

16. The database system of claim 9, further comprising instructions for lazily propagating updates to the consistent hash ring after step (d).

* * * * *